Figure 1:
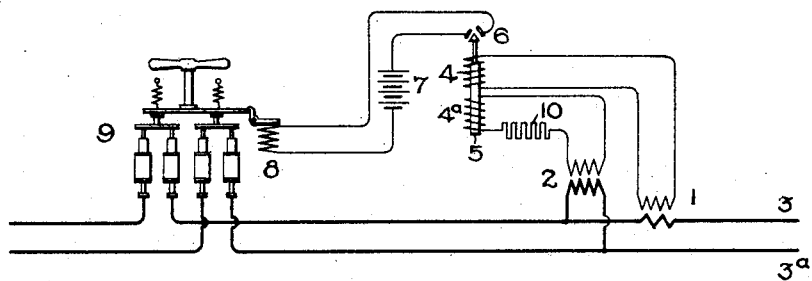

No. 789,475. PATENTED MAY 9, 1905.
J. E. WOODBRIDGE.
CIRCUIT BREAKER.
APPLICATION FILED JULY 3, 1902.

Witnesses.

Inventor.
Jonathan E. Woodbridge
by Albert G. Davis
Atty.

No. 789,475.

Patented May 9, 1905.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

CIRCUIT-BREAKER.

SPECIFICATION forming part of Letters Patent No. 789,475, dated May 9, 1905.

Application filed July 3, 1902. Serial No. 114,219.

*To all whom it may concern:*

Be it known that I, JONATHAN E. WOODBRIDGE, a citizen of the United States, residing at Schenectady, county of Schenectady, State of New York, have invented certain new and useful Improvements in Circuit-Breakers, of which the following is a specification.

In the distribution of electric energy it is necessary to guard against a reversal of direction of energy-flow or power-flow in the circuit. For example, in a system in which alternating-current generators are connected in multiple with a common set of bus-bars in case the potential of the machine should fall much below that of the bus-bars it is desirable to have the machine automatically cut out of circuit. Also in systems which include rotary converters feeding storage batteries a short-circuit on the alternating-current side permits a reversal in the direction of energy-flow when the circuit should be opened. So in the distribution of direct currents where storage batteries are supplied a similar contingency arises when the potential of the supply-circuit falls below that of the batteries. For the purpose of insuring the opening of the circuit under such contingencies a type of device known as a "reversal relay" or "reverse-current relay" has been employed, which commonly comprises two elements, one rotative relatively to the other and excited by a coil connected in shunt and the other by a coil in series relation to the circuit, a reversal in the direction of energy-flow serving to shift the movable element of the relay and trip a circuit-breaker or otherwise open the circuit. Such devices, however, do not give satisfaction under all circumstances, especially when there is a short-circuit, which materially lowers the potential between the conductors across which the potential-coil of the relay is connected, and inasmuch as the principal object of the employment of reversal relays is to provide for opening the circuit or cutting out translating devices under short-circuiting conditions this defect is serious.

In connection with polyphase work a short-circuit on one of the phases so distorts the delta that the Y and delta currents and potentials may have a very different phase relation from that for which the relay is designed, which would thus render its action uncertain. To render the action of the instrument more reliable, an arrangement has been proposed in which the motor-winding is replaced by a compound solenoid composed of two windings, one in circuit with the current-transformers of the system to be protected and the other in circuit with the potential-transformers. The coils are normally connected, so that under a normal phase relation the two windings neutralize one another, or at least oppose one another, so that the relay remains in its open position; but when the direction of energy or power flow reverses the two coils conspire and lift the plunger or core and close the local circuit which acts upon the translating device—as, for example, a trip-coil, which may actuate a ciruit-breaker. With such an organization it is obvious that a serious error in the phase difference of the volts and amperes has a value in affecting its operation. If in the case of an absolute short-circuit the potential is reduced to zero, the current alone will operate the relay, since the opposing effort of the potential-coil is withdrawn. Moreover, in case of an excessive overload the relay may be made to respond, since under such conditions the series coil may be permitted to overpower the potential-coil to a sufficient degree to insure the operation of the relay. The device may also operate under excessive wattless currents, the phase of the magnetic force set up by the current-coil being in this case ninety degrees removed from that set up by the potential-coil and combining therewith to give a resultant magnetism equal in magnitude to the hypotenuse of a triangle whose two sides represent, respectively, the current and potential. Thus a device of this character may be relied upon to more certainly control the supply of power under such conditions as require reliable control than the devices heretofore used for that purpose. Where the two coils are caused to act differentially on a common circuit, as in an instrument of this type, I find it absolutely necessary to introduce a high resistance in the secondary circuit of the potential-transformer; otherwise the reaction on such circuit of the series-transformer is such as to seriously impair the reliability of the instrument. Where the instrument is used in connection with a triphase circuit, I employ two transformers and derive the potential-coils of the relay from a mixed secondary circuit including, in addition to the secondary winding of one transformer, part of the other, so as to bring the phase relations of the series and potential transformers more closely together.

My invention therefore comprises a reversal relay the movable element of which is controlled by differentially-acting coils, one in series and the other in potential relation to the power-circuit, the secondary circuit of the potential-transformer being made of sufficiently high resistance to preserve a substantial closeness of phase of the two controlling-transformers.

It comprises also other features, the novelty of which will be hereinafter more fully described, and will be definitely indicated in the appended claims.

Figure 2:
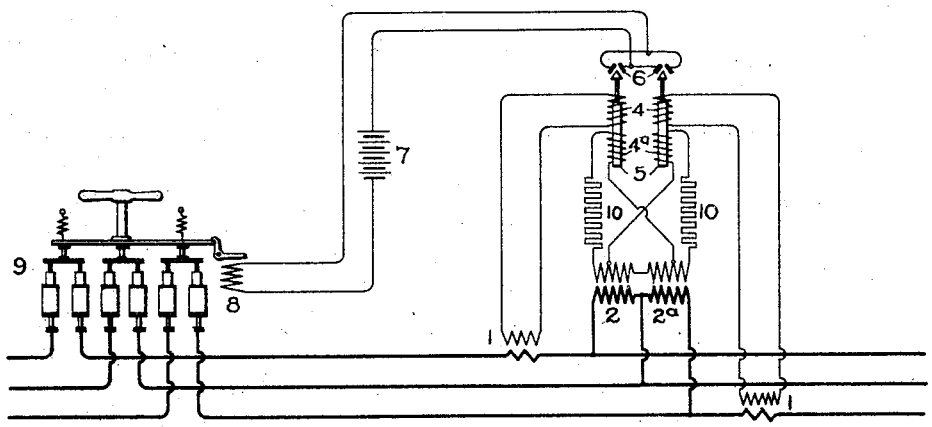

In the accompanying drawings, which illustrate an embodiment of my invention, Figure 1 is a diagram showing the application of my invention to a single-phase alternating circuit. Fig. 2 is a similar diagram showing its application to a triphase circuit, and Fig. 3 is a diagrammatic illustration of the method of effecting phase adjustment of the secondary circuits.

Referring first to Fig. 1, 1 represents a series transformer, and 2 a potential-transformer, which govern the action of the relay, these two transformers being connected in a power-supply circuit 3 $3^a$. The secondaries of the transformers are connected with two coils 4 $4^a$, acting upon a common core 5, on which is carried a bridging contact adapted to cross-connect an open point 6 of a local circuit including a source of direct current 7 and an operating device for insuring the control desired. This operating device is shown in the diagram as a trip-coil 8, acting on the latch of an automatic circuit-breaker 9. This circuit-breaker is shown by a conventional illustration and represents a high-potential switch of the oil-break type, in which a series of bridging contacts are mounted for opening-and-closing movement in a series of oil-pots in which the fixed contacts are insulated. In the secondary-circuit of the potential-transformer is inserted a resistance 10, which should be non-inductive and great relatively to the impedance of the potential-coil on the relay. It is extremely important for reliable operation that this resistance be employed; otherwise there will be a transformer action between the two coils on the relay, the current-transformer predominating over the potential-transformer or the potential-transformer conversely predominating over the current-transformer. With the resistance in circuit, however, the magnetic force set up by the potential-coil of the relay will be proportional to and in phase with the potential across the transformer 2. The current through the secondary circuit of the potential-transformer will not be materially affected by the current-coil on the relay. The resultant flux in the magnetic circuit of the relay will then be a true vector resultant of the potential and the current. The circuit connections should be such that when power is flowing in the normal direction the two coils 4 $4^a$ of the relay oppose one another. In case of a reversal of power-flow the potential-coil remains unaffected, but the series coil reverses its direction, and thus causes the two coils 4 $4^a$ of the relay to conspire and close the local circuit, tripping the circuit-breaker, and thereby cutting off the power.

For quarterphase circuits two such relays as those indicated in Fig. 1 may be employed, one in each phase and either adapted to act on the trip-coil of the breaker. For concatenated circuits, such as triphase circuits, a somewhat different connection is employed. Such an organization is shown in Fig. 2. In this case I employ two relays, either of which may close the local circuit and trip the switch through the solenoid-plungers, which connect in parallel relation to the local circuit. Each of the relays is controlled by series coils derived from different phases, and in order to bring the potentials on the potential-coils into phase with the currents in the corresponding current-coils under conditions of unity-power factor two potential-transformers are used fitted with half-voltage taps, by which coincidence of phase is established. Thus one relay is supplied with current derived from all of the secondary coil of transformer 2 and half of that of the transformer $2^a$, whereas the other relay is supplied from all of the secondary of transformer $2^a$ and half of that of transformer 2, thereby adjusting the phase relations of the two coils on each relay, so that they have the proper working relation. It is not absolutely essential, of course, that these phases should be coincident and opposed, since the lifting power to close the local circuit may be adjusted so that a considerable preponderance of one over the other will be necessary to open the switch.

Figure 3:
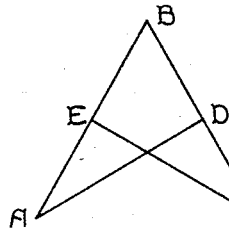

The diagram in Fig. 3 shows in a diagrammatic way the method of adjusting the phases. If AB represents the potential of one transformer and BC that of the other, one of the relay potential-coils is in phase AD and the other in phase CE, which are coincident with the currents in the legs A and C under conditions of unity-power factor.

What I claim as new, and desire to secure by Letters Patent of the United States, is—

1. A reversal relay comprising fixed and movable members, opposing windings therefor, series and potential transformers in the controlled circuit supplying said windings respectively, and means for preserving substantially constant phase relations in the secondary circuits.

2. A reversal relay comprising fixed and movable members, opposing windings therefor, series and potential transformers in the controlled system supplying said windings respectively, and an auxiliary resistance in one of the secondary circuits.

3. A reversal relay comprising fixed and movable members, opposing windings therefor, series and potential transformers in the controlled system supplying said windings respectively, and an auxiliary resistance in the secondary circuit of the potential-transformer.

4. A reversal relay comprising fixed and movable members, opposing windings therefor, series and potential transformers in the controlled system supplying said windings respectively and an auxiliary resistance in one of the secondary circuits large relatively to the impedance of the secondary winding of the supplying-transformer.

5. A reversal relay provided with coils, potential and current transformers in the controlled system supplying the same, and means for approximating the phases of the secondary currents of said transformers.

6. A reversal relay provided with differential windings governing its movable member, in combination with a polyphase system, series and potential transformers in the said system supplying said windings, the secondary potential-winding being influenced by several phases.

7. A reversal relay provided with differential windings governing the movable member, in combination with a polyphase system, and series and potential transformers in the said system supplying said windings, the secondary potential-winding being derived from a compound primary controlled by several phases.

In witness whereof I have hereunto set my hand this 2d day of July, 1902.

JONATHAN E. WOODBRIDGE.

Witnesses:
 BENJAMIN B. HULL,
 HELEN ORFORD.